(12) United States Patent
Takeda (10) Patent No.: US 11,163,363 B2
(45) Date of Patent: Nov. 2, 2021

(54) TACTILE SENSATION PROVIDING APPARATUS

(71) Applicant: KYOCERA Corporation, Kyoto (JP)

(72) Inventor: Jun Takeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 75 days.

(21) Appl. No.: 15/778,874

(22) PCT Filed: Nov. 10, 2016

(86) PCT No.: PCT/JP2016/083401
§ 371 (c)(1),
(2) Date: May 24, 2018

(87) PCT Pub. No.: WO2017/090448
PCT Pub. Date: Jun. 1, 2017

(65) Prior Publication Data
US 2019/0025920 A1      Jan. 24, 2019

(30) Foreign Application Priority Data
Nov. 27, 2015  (JP) .............................. JP2015-232181

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01)

(58) Field of Classification Search
CPC .......................... G06F 3/016; G06F 3/041–047

USPC ......................................................... 345/173
See application file for complete search history.

(56) References Cited

U.S. PATENT DOCUMENTS

| | | | |
|---|---|---|---|
| 8,203,534 B2 | 6/2012 | Nishimura et al. | |
| 9,317,122 B2 | 4/2016 | Kono | |
| 9,459,713 B2 | 10/2016 | Okumura et al. | |
| 2006/0232564 A1 | 10/2006 | Nishimura et al. | |
| 2013/0009893 A1* | 1/2013 | Okumura | G06F 3/041 345/173 |
| 2013/0285506 A1 | 10/2013 | Takeda | |
| 2014/0176318 A1 | 6/2014 | Kono | |
| 2015/0116920 A1* | 4/2015 | Franklin | G06F 1/1626 361/679.26 |
| 2016/0132117 A1* | 5/2016 | Adachi | G06F 3/0488 345/173 |

FOREIGN PATENT DOCUMENTS

| | | |
|---|---|---|
| EP | 2472666 A1 | 7/2012 |
| JP | 2006-215849 A | 8/2006 |
| JP | 2013-033458 A | 2/2013 |
| WO | 2013-027374 A | 2/2013 |

* cited by examiner

*Primary Examiner* — Stephen G Sherman
(74) *Attorney, Agent, or Firm* — Studebaker & Brackett PC (57) ABSTRACT

A tactile sensation providing apparatus includes a panel, a tactile sensation providing unit that is attached to the panel and configured to vibrate the panel, and joint structures with respect to a housing. The joint structure is different between a first area in which the tactile sensation providing unit is arranged and a second area other than the first area.

20 Claims, 8 Drawing Sheets

TACTILE SENSATION PROVIDING APPARATUS

CROSS REFERENCE TO RELATED APPLICATION

This application claims priority to and the benefit of Japanese Patent Application No. 2015-232181 (filed on Nov. 27, 2015), the entire contents of which are incorporated herein by reference.

TECHNICAL FIELD

The present disclosure relates to a tactile sensation providing apparatus.

BACKGROUND

To ensure reliability of a touch panel, a periphery of the touch panel is conventionally covered by an elastic member (e.g., see PLT 1).

CITATION LIST

Patent Literature

PLT 1: WO 2013/027374

SUMMARY

A tactile sensation providing apparatus according to an embodiment of the present disclosure includes a panel, a tactile sensation providing apparatus that is attached to the panel and configured to vibrate the panel, and joint structures with respect to a housing. The joint structure is different between a first area in which the tactile sensation providing apparatus is arranged and a second area other than the first area.

DETAILED DESCRIPTION

When a touch panel provides a tactile sensation, tightly attaching an elastic member to a periphery of the touch panel to ensure reliability attenuates the amplitude of the tactile sensation and an adequate tactile sensation cannot be provided. On the other hand, loosening the elastic member covering the periphery of the touch panel to reduce the attenuation of the amplitude of the tactile sensation may possibly compromise reliability of the touch panel.

A tactile sensation providing apparatus according to the present disclosure may be used as a switch for in-vehicle equipment, such as a car navigation system, a steering wheel, or a powered window. The tactile sensation providing apparatus may be used in a mobile phone, a smartphone, a tablet computer (a personal computer), or a laptop computer equipped with a touch panel, etc. The tactile sensation providing apparatus is not limited thereto but may be used for various electronic devices equipped with a touch panel, including desktop computers, home appliances, industrial equipment or FA (Factory Automation) equipment, special-purpose terminals, etc. The figures used herein are schematically illustrative. The figures are not necessarily drawn to scale.

First Embodiment

Configuration of Tactile Sensation Providing Apparatus

Figure 1:
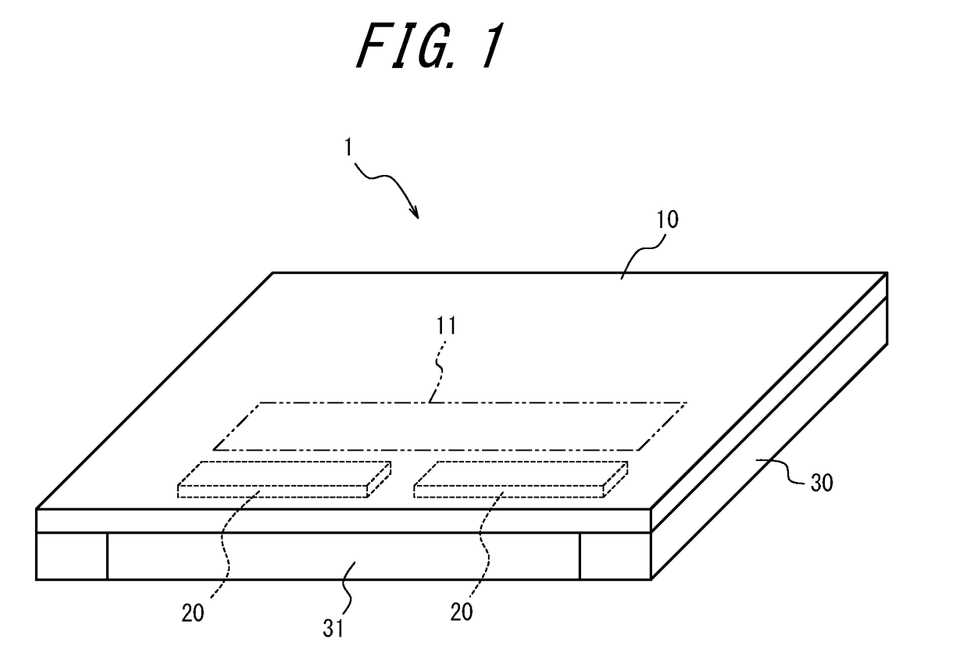
FIG. 1 is a perspective view of a front side of a tactile sensation providing apparatus according to a first embodiment.

As illustrated in FIG. 1 to FIG. 5, a tactile sensation providing apparatus 1 according to a first embodiment includes a touch panel 10, a tactile sensation providing unit 20, a first joint member 31, and a second joint member 30. The touch panel 10 may include a touch sensor 50 (see FIG. 6). The touch panel 10 is capable of detecting contact by a finger or a stylus pen in respect of a touch surface of the touch panel 10. The touch panel 10 may detect contact by employing any appropriate method including a capacitive method, a resistive film method, a surface acoustic wave method or an ultrasound method, an infrared method, an electromagnetic induction method, or a load detection method. In FIG. 1, the touch panel 10 has a rectangular shape. The shape of the touch panel 10 is not limited thereto. The touch panel 10 may have a curved periphery. The touch panel 10 may have no corners. The touch panel 10 may be a panel constituting a switch.

The tactile sensation providing unit 20 is arranged on the rear side of the touch panel 10. The tactile sensation providing unit 20 may be configured as a piezoelectric element, an ultrasonic transducer, a vibration motor, or an eccentric motor. The tactile sensation providing unit 20 generates vibration in a vibration pattern corresponding to, for example, a click sensation, the feel of a material, etc. and thus may provide the user who is touching the touch panel 10 with the tactile sensation such as the click sensation and the feel of the material. According to the present embodiment, two tactile sensation providing units 20 are arranged. However, the number of the tactile sensation providing unit 20 is not limited thereto and may be one or three or more.

According to the present embodiment, the tactile sensation providing unit 20 is configured as a piezoelectric element. Hereinafter, the tactile sensation providing unit 20 may also be referred to as a piezoelectric element 20. The piezoelectric element 20 is fixed to the touch panel 10 via an adhesive or the like. The method of fixing the piezoelectric element 20 is not limited thereto. According to the present embodiment, the piezoelectric element 20 is disposed in the vicinity of a periphery of the touch panel 10. The position of the piezoelectric element 20 is not limited thereto.

The piezoelectric element 20 generates vibrations in various patterns depending on voltages applied thereto. The piezoelectric element 20 may be configured with a piezoelectric film or a piezoelectric ceramic. The piezoelectric ceramic may generate vibrations with greater vibration energy than the piezoelectric film.

The vibration generated by the piezoelectric element 20 is transmitted to the touch panel 10 to which the piezoelectric element 20 is attached. In other words, the piezoelectric element 20 vibrates the touch panel 10. A vibration direction of the vibration transmitted to the touch panel 10 from the piezoelectric element 20 may be along a direction normal to the surface of the touch panel 10 or along a direction in the plane of the surface of the touch panel 10. Regardless of the vibration direction, the tactile sensation is provided to a user who touches the touch panel 10 with a finger or a stylus pen.

FIGS. 1, 2, 3, 4A, and 4C illustrate a tactile sensation providing area 11 in which the tactile sensation is provided by the transmission of the vibration generated by the piezoelectric element 20. The tactile sensation providing area 11 is shown as an area encompassed by a two-dot chain line, and is located in the vicinity of the lower periphery of the touch panel 10 having the piezoelectric element 20 attached thereto. The tactile sensation providing area 11 is indicated for convenient description of the present embodiment and is not actually indicated on the touch panel 10. The tactile sensation providing area 11 does not mean that the tactile sensation is provided only inside the tactile sensation providing area 11. The tactile sensation providing area 11 does not mean that the tactile sensation is not provided at all outside the tactile sensation providing area 11.

The first joint member 31 and the second joint member 30 are provided at the periphery of the touch panel 10 on the rear side thereof. The first joint member 31 and the second joint member 30 are joined to the housing 5. The tactile sensation providing apparatus 1 is joined to the housing 5 via the first joint member 31 and the second joint member 30.

According to the present embodiment, the tactile sensation providing unit 20 is arranged in the vicinity of the periphery of the touch panel 10 having the first joint member 31 attached thereto.

Joint Structure of Tactile Sensation Providing Apparatus and Housing

Figure 4A:
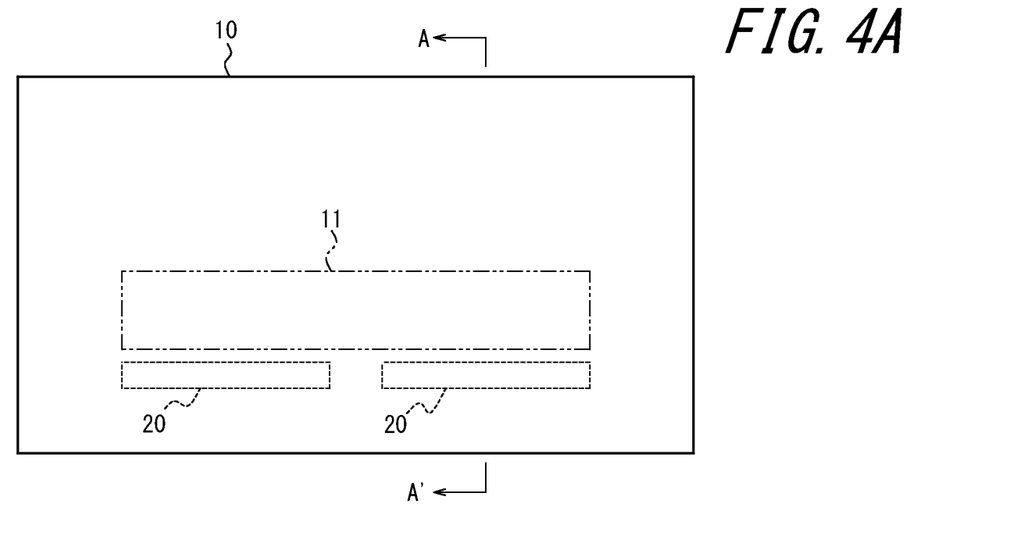
FIG. 4A is a plan view of the tactile sensation providing apparatus of FIG. 1.
Figure 4B:
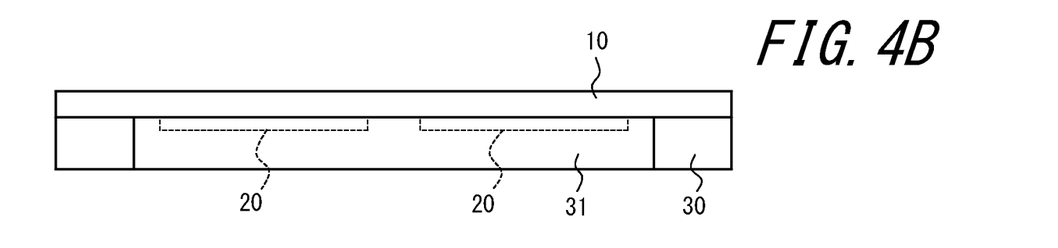
FIG. 4B is a front view of the tactile sensation providing apparatus of FIG. 1.
Figure 4C:
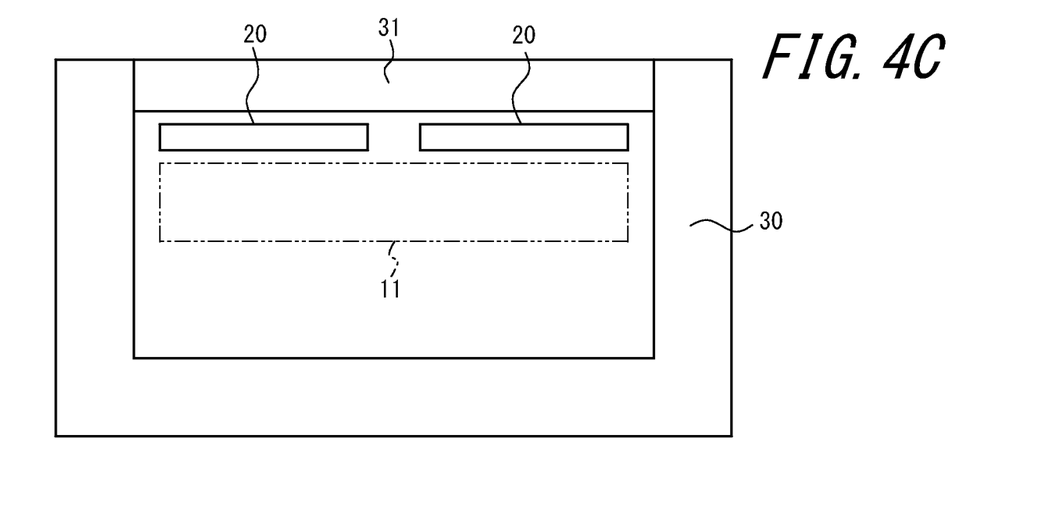
FIG. 4C is a bottom view of the tactile sensation providing apparatus of FIG. 1.
Figure 5:
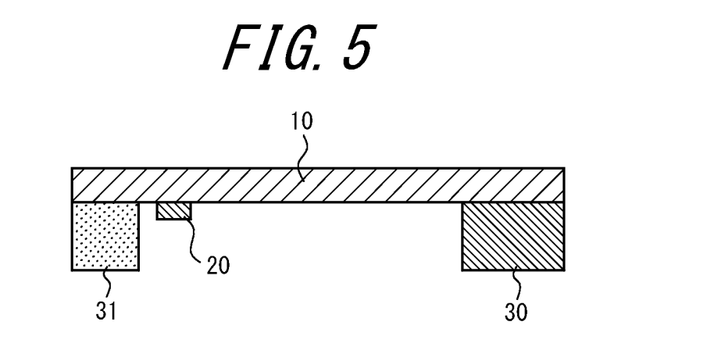
FIG. 5 is a cross-sectional view taken from line A-A' of FIG. 4A.

As illustrated in FIGS. 4A, 4B, and 4C by way of example, the first joint member 31 and the second joint member 30 are attached to the rear side of the touch panel 10. The first joint member 31 and the second joint member 30 together cover the whole periphery of the touch panel 10. The first joint member 31 and the second joint member 30 are attached to the touch panel 10 via an adhesive, for example. The first joint member 31 and the second joint member 30 may be otherwise attached to the touch panel 10.

As illustrated in FIGS. 4A, 4B, and 4C by way of example, the second joint member 30 is attached to three edges of the touch panel 10. The first joint member 31 is attached to the remaining edge of the touch panel 10. Positions of the first joint member 31 and the second joint member 30 attached to the touch panel 10 are not limited thereto. The first joint member 31 may be attached to two or more edges of the touch panel 10. The first joint member 31 and the second joint member 30 made of different materials may be attached to the same edge of the touch panel 10. When the touch panel 10 has a shape other than a rectangular shape, the first joint member 31 and the second joint member 30 may be attached to the touch panel 10 together in conformance with the peripheral shape of the touch panel 10.

Figure 3:
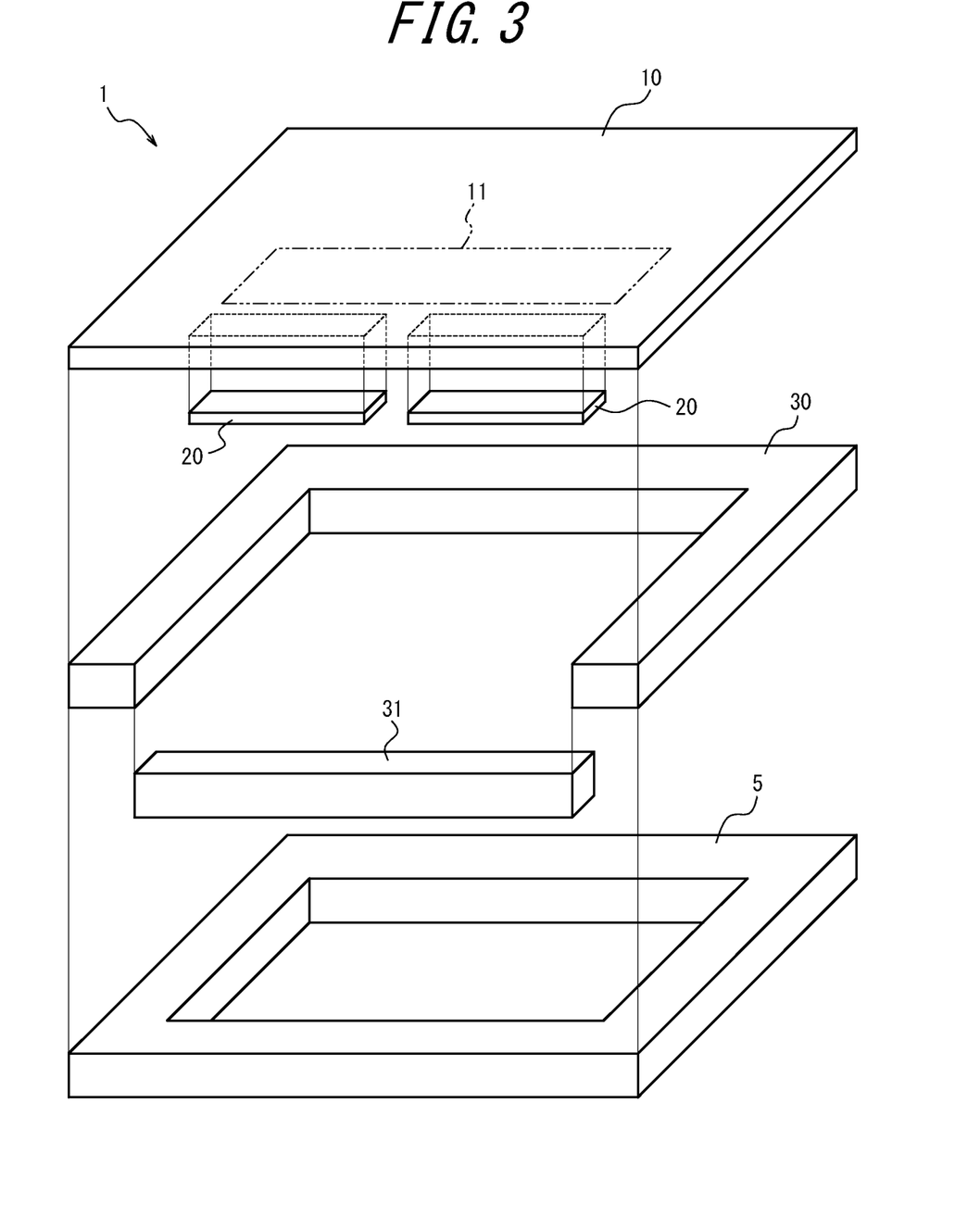
FIG. 3 is an exploded perspective view of the tactile sensation providing apparatus of FIG. 1.

As illustrated in FIG. 3, when the first joint member 31 and the second joint member 30 are attached to the housing 5, the tactile sensation providing apparatus 1 is joined to the housing 5. Hereinafter, the structure that includes the first joint member 31 and the second joint member 30 to join the tactile sensation providing apparatus 1 to the housing 5 is also referred to as a joint structure with respect to the housing 5.

The housing 5 may be, for example, a part of an instrument panel or a center console of an automobile. The housing 5 may be a part of a mobile apparatus. The housing 5 is not limited thereto but may be a part of various apparatuses. When the tactile sensation providing apparatus 1 is joined to the housing 5, the first joint member 31 and the second joint member 30 together cover all peripheries of the touch panel 10. Covering all peripheries of the touch panel 10 may improve dustproof properties and waterproof properties of a joint between the tactile sensation providing apparatus 1 and the housing 5.

The joint structure between the tactile sensation providing apparatus 1 and the housing 5 may function, in addition to the improvement in the dustproof properties and the waterproof properties, to enhance, for example, resistance against an external force. The dustproof properties and the waterproof properties together with the resistance against an external force may be collectively referred to as reliability. From the viewpoint of improving the reliability, including resistance to an external force, the joint structure of the tactile sensation providing apparatus 1 may include firm fixing with respect to the housing 5.

In the tactile sensation providing apparatus 1, the vibration generated by the piezoelectric element 20 is transmitted to the touch panel 10 and thus provides the tactile sensation to a user who is touches the touch panel 10 with a finger or a stylus pen. When the tactile sensation providing apparatus 1 and the housing 5 are firmly fixed to each other, the periphery of the touch panel 10 is firmly fixed. This may significantly attenuate the vibration transmitted to the touch panel 10 from the piezoelectric element 20. In this case, the tactile sensation providing apparatus 1 may not adequately provide a tactile sensation. From the viewpoint of improving the performance to provide the tactile sensation, the joint structure of the tactile sensation providing apparatus 1 may have a structure that allows the touch panel 10 of the tactile sensation providing apparatus 1 to adequately provide the tactile sensation.

As compared to a joint structure according to a comparative example described below, the joint structure between the tactile sensation providing apparatus 1 and the housing 5 according to the present embodiment may simultaneously improve the reliability of the tactile sensation providing apparatus 1 and the performance to provide the tactile sensation.

Joint Structure According to Comparative Example

The joint structure between the tactile sensation providing apparatus 1 and the housing 5 according to the comparative example is assumed to include either one of the first joint member 31 and the second joint member 30. In this case, the tactile sensation providing apparatus 1 and the housing 5 are joined together via the same member throughout the peripheries of the touch panel 10. Thus, joint intensity of the tactile sensation providing apparatus 1 and the housing 5 is approximately uniform throughout the peripheries of the touch panel 10.

In the joint structure according to the comparative example, when the joint strength is reduced to improve the performance to provide the tactile sensation, the joint strength of the tactile sensation providing apparatus 1 as a whole in respect of the housing 5 may decrease. The decrease in the joint strength may compromise the reliability of the joint structure between the tactile sensation providing apparatus 1 and the housing 5.

In the joint structure according to the comparative example, when the joint strength is increased to improve the reliability of the joint structure, the periphery of the touch panel 10 having the piezoelectric element 20 attached thereto may be firmly fixed. The attenuation of the vibration generated by the piezoelectric element 20 may increase in proportion to the fixing strength of the periphery of the touch panel 10. When the attenuation of the vibration is large, the tactile sensation providing performance may deteriorate.

Accordingly, the joint structure according to the comparative example is unlikely to simultaneously improve the reliability of the tactile sensation providing apparatus 1 and the tactile sensation providing performance.

Joint Structure According to Present Embodiment

In the tactile sensation providing apparatus 1 according to the present embodiment, the joint structure between the touch panel 10 and the housing 5 includes the first joint member 31 and the second joint member 30. A first area having the piezoelectric element 20 arranged therein and a second area corresponding to the remaining area have different joint structures between the touch panel 10 and the housing 5. The first area includes a position in which the piezoelectric element 20 is arranged and a neighboring area thereof.

Figure 2:
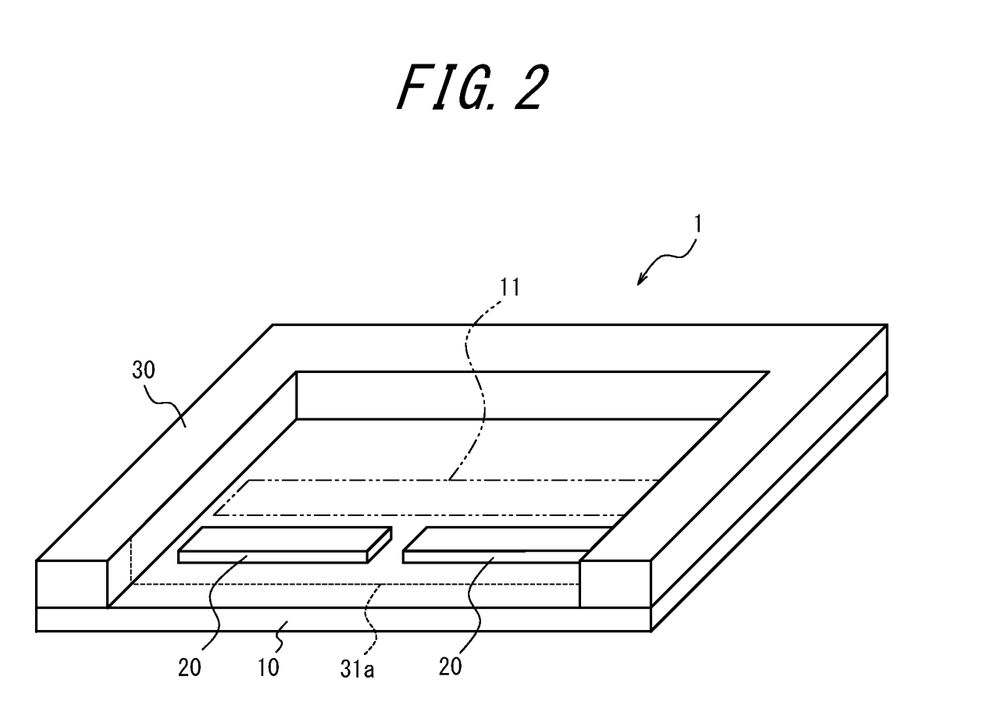
FIG. 2 is a perspective view of a rear side of the tactile sensation providing apparatus of FIG. 1.

In the tactile sensation providing apparatus 1 according to the present embodiment, the first joint member 31 is attached to one edge or one end of the touch panel 10 in the first area. The second joint member 30 is attached to the remaining three edges or ends of the touch panel 10 in the second area (e.g., see FIG. 1 and FIG. 2). In FIG. 2, the first joint member 31 is omitted in order that the piezoelectric element 20 is visible. In place of the first joint member 31, an attaching position 31a of the first joint member 31 is indicated by dotted lines. It should be appreciated that this indication is made merely for convenience of explanation.

In other words, in the structure illustrated in FIG. 2 the first joint member 31 is attached to the periphery of the touch panel 10 in the first area having the piezoelectric element 20 arranged thereon. The second joint member 30 is attached to the peripheries of the touch panel 10 in the second area corresponding to the remaining area.

According to the present embodiment, the first joint member 31 and the second joint member 30 have different configurations. The configuration of the first joint member 31 may include a material, a shape, and other attributes of the first joint member 31. The shape of the first joint member 31 may include, for example, a width, a thickness, and a cross-sectional shape of the first joint member 31. The same applies to the second joint member 30.

In the joint structure according to the present embodiment, when the joint strength of the tactile sensation providing apparatus 1 and the housing 5 is reduced to improve the performance to provide the tactile sensation, unlike the comparative example, the joint strength of the first area alone having the piezoelectric element 20 arranged thereon may be reduced. On the other hand, the joint strength of the second area corresponding to the remaining area may be increased. In this way, the tactile sensation providing apparatus 1 may improve the tactile sensation providing performance while maintaining the joint strength between the touch panel 10 and the housing 5 as a whole.

When the first area and the second area have different joint strengths, these areas have different vibration attenuation levels at the peripheries of the touch panel 10. That is, in the joint structure according to the present embodiment, the attenuation of the vibration at the periphery of the touch panel 10 in the first area is smaller than in the second area. Hereinafter, from the viewpoint of reducing the attenuation of the vibration, a difference between the configuration of the first joint member 31 attached to the first area and the second joint member 30 attached to the second area will be described.

The vibration direction of the touch panel 10 may be, as described above, along the direction normal to or in the plane of the surface of the touch panel 10. The structure for reducing the attenuation of the vibration differs depending on the vibration direction.

When the vibration direction of the touch panel 10 is the direction normal to the surface of the touch panel 10, the joint structure may designed such that a spring constant of the first joint member 31 is smaller than a spring constant of the second joint member 30. This joint structure may reduce the attenuation of the vibration at the periphery of the touch panel 10 having the first joint member 31 attached thereto.

According to the present embodiment, the spring constant of the joint member may be calculated as a proportionality constant between the magnitude of a compressive force or a tensile force applied to the joint member and an amount of extension/contraction of the joint member with respect to an axis in the direction normal to the surface of the touch panel 10. When the joint member extends along the periphery of the touch panel 10, the spring constant of the joint member may be calculated for a unit length in the extending direction. The spring constant of the joint member may be determined on the basis of a shape of the joint member or a constant specific to the material of the joint member, such as the Young's modulus. The Young's modulus is also referred to as a modulus of longitudinal elasticity.

When the vibration direction of the touch panel 10 corresponds to the direction in the plane of the surface of the touch panel 10, the joint structure may be designed such that a shear spring constant of the first joint member 31 is smaller than a shear spring constant of the second joint member 30. This joint structure may reduce the attenuation of the vibration at the periphery of the touch panel 10 having the first joint member 31 attached thereto.

According to the present embodiment, the sheer spring constant of the joint member may be calculated as the proportionality constant between the magnitude of a sheer force applied to the joint member and the amount of sheer strain of the joint member with respect to the axis in the direction normal to the surface of the touch panel 10. When the joint member extends along the periphery of the touch panel 10, the sheer spring constant of the joint member may be calculated for a unit length in the extending direction. The sheer spring constant of the joint member may be determined on the basis of the shape of the joint member or the constant specific to the material of the joint member, such as rigidity. The rigidity is also referred to as a sheer modulus or a modulus of transverse elasticity.

According to the present embodiment, the second joint member 30 may be made of, for example, hard rubber. The first joint member 31 may be made of, for example, a soft sponge-like material. The combination of materials is not limited thereto. According to this configuration, the spring constant of the first joint member 31 is smaller than the spring constant of the second joint member 30, and/or the sheer spring constant of the first joint member 31 is smaller than the sheer spring constant of the second joint member 30. Thus, the attenuation of the vibration at the periphery of the touch panel 10 in the first area having the piezoelectric element 20 arranged therein is smaller than the attenuation of the vibration at the peripheries of the touch panel 10 in the second area corresponding to the remaining area.

From the viewpoint of reducing the attenuation of the vibration, as described above, the first joint member 31 and the second joint member 30 have different configurations. As illustrated in FIG. 2, attaching the first joint member 31 to the periphery of the touch panel 10 in the first area having the piezoelectric element 20 arranged therein may reduce the attenuation of the vibration generated by the piezoelectric element 20. In this way, a magnitude of vibration that is sufficient to provide the tactile sensation to the user may be ensured in the tactile sensation providing area 11 of the touch panel 10. The magnitude of the vibration is also referred to as the amplitude of the vibration.

The first joint member 31 and the second joint member 30 may have different configurations not only from the viewpoint of reducing the attenuation of the vibration as described above, but also from the viewpoint of providing highly reliable joint.

As described above, the spring constant and/or the sheer spring constant of the first joint member 31 may be smaller than the spring constant and/or the sheer spring constant of the second joint member 30. In other words, attaching the second joint member 30 rather than the first joint member 31 may reduce the possibility of displacement of the periphery of the touch panel 10 caused by an external force. In this case, the tactile sensation providing apparatus 1 may have high rigidity. The tactile sensation providing apparatus 1 and the housing 5 may have high joint strength.

According to the present embodiment, the second joint member 30 is attached to the three edges of the tactile sensation providing apparatus 1, and the first joint member 31 is attached to the remaining edge. In this case, the low rigidity of the edge having the first joint member 31 attached thereto may be counterbalanced by the high rigidity of the three edges having the second joint member 30 attached thereto. In this case, overall rigidity of the tactile sensation providing apparatus 1 may be increased. On the other hand, attaching the first joint member 31 to the periphery of the touch panel 10 in the first area having the piezoelectric element 20 arranged therein may reduce the attenuation of the vibration of the corresponding periphery of the touch panel 10. In this way, the tactile sensation providing area 11 of the touch panel 10 may acquire a magnitude of the vibration that is sufficient to provide the tactile sensation to the user. The magnitude of the vibration is also referred to as the amplitude of the vibration.

According to the present embodiment, the joint structure between the tactile sensation providing apparatus 1 and the housing 5 may differ between the first area having the piezoelectric element 20 arranged therein and the second area corresponding to the remaining area. This structure may enable the tactile sensation providing apparatus 1 to ensure a sufficient magnitude of vibration while enhancing the reliability of the joint structure.

Although the first joint member 31 is attached to one of the four edges of the touch panel 10 according to the present embodiment, this is not restrictive. Depending on the position of the piezoelectric element 20, the first joint member 31 may be attached to two or three edges. In this case, the second joint member 30 attached to the remaining edge(s) may enforce the overall rigidity of the tactile sensation providing apparatus 1.

The structure described in the present embodiment is also applicable to a touch panel 10 that includes curved peripheries or does not have corners, unlike the touch panel 10 having the rectangular shape according to the present embodiment. For example, the first joint member 31 may be attached to a portion of the periphery of the touch panel 10 included in the first area having the piezoelectric element 20 arranged therein. On the other hand, the second joint member 30 may be attached to the other portion of the periphery.

As described above, the tactile sensation providing apparatus 1 according to the present embodiment does not need to have the same joint structure with respect to the housing 5 throughout all peripheries. In the tactile sensation providing apparatus 1 according to the present embodiment, the joint structure between the tactile sensation providing apparatus 1 and the housing 5 in the first area having the piezoelectric element 20 arranged therein is different from the joint structure in the second area.

In other words, in the tactile sensation providing apparatus 1 according to the present embodiment, the first area and the second area employ different joint methods. In the tactile sensation providing apparatus 1 according to the present embodiment, the first joint member 31 attached to the first area and the second joint member 30 attached to the second area may have different spring constants and/or sheer spring constants. In the tactile sensation providing apparatus 1 according to the present embodiment, the material of the first joint member 31 attached to the first area and the material of the second joint member 30 attached to the second area may have different Young's moduli and/or rigidity.

The configuration of the tactile sensation providing apparatus 1 as described above may reduce the attenuation of the vibration transmitted to the touch panel 10 from the piezoelectric element 20. Thus, a sufficient magnitude of vibration is transmitted to the tactile sensation providing area 11, and a tactile sensation is provided to the user. The joint between the tactile sensation providing apparatus 1 and the housing 5 may become more reliable.

Operation of Tactile Sensation Providing Apparatus

Figure 6:
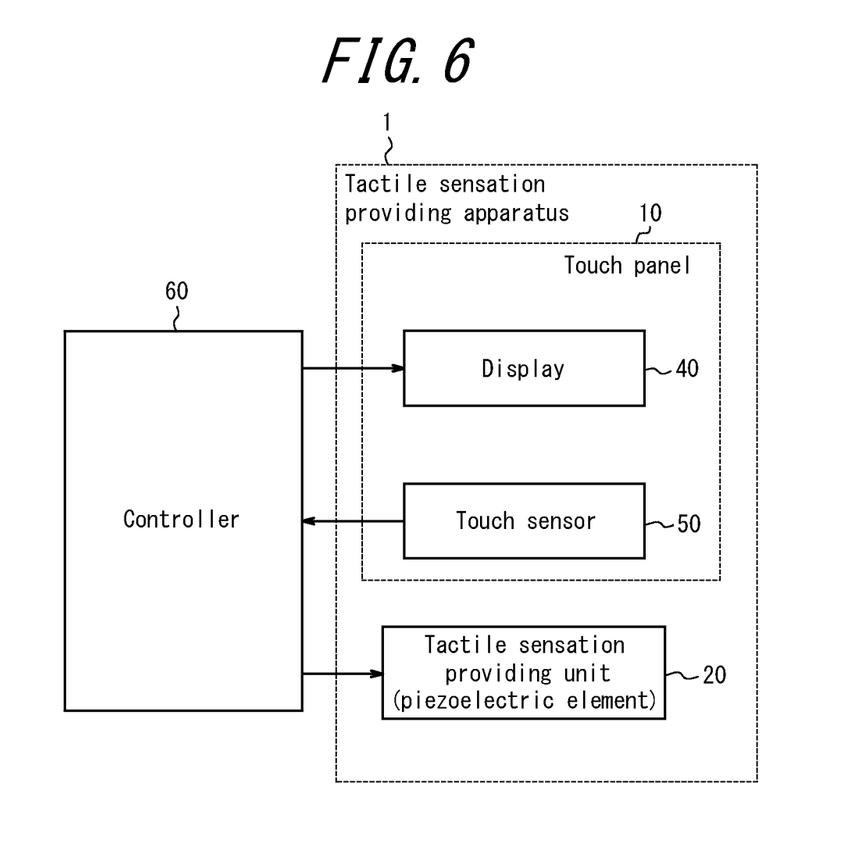
FIG. 6 is a functional block diagram schematically illustrating an example configuration of a tactile sensation providing apparatus according to an embodiment.

FIG. 6 is a functional block diagram schematically illustrating an example configuration of the tactile sensation providing apparatus 1 according to an embodiment. In the example illustrated in FIG. 6, the touch panel 10 of the tactile sensation providing apparatus 1 includes a display 40 and the touch sensor 50. In this case, the touch panel 10 may include the display 40 having the touch sensor 50 attached thereto. The touch panel 10 may be of an in-cell type or on-cell type in which the touch sensor 50 is incorporated in the display 40.

The display 40 displays characters, images, operation objects, pointers, etc. For example, when the display 40 is provided to a mobile electronic device, the display 40 may display operation objects for phone calls, emails, an internet browser, a camera, and so on in a home screen. When the display 40 is provided to an in-vehicle electronic device, the display 40 may display operation objects for navigation, audio, air conditioning, and so on in the home screen.

The display 40 may be, but is not limited to, a liquid crystal display, an organic EL display, or an inorganic EL display.

The tactile sensation providing apparatus 1 does not necessarily need to display an image etc. When the touch panel 10 does not display an image etc., the touch panel 10 does not need to include the display 40. In this case, the display 40 may be arranged separately from the tactile sensation providing apparatus 1. When an operation is performed in respect of the touch panel 10 to move a cursor or a pointer displayed on the display 40, an operation button of an operation object or the like displayed on the display 40 may be operated.

The touch sensor 50 detects contact by the finger or the stylus pen in respect of the touch surface of the touch sensor 50, acquires a coordinate of a position of the contact, and then outputs the coordinate to a controller 60. The touch sensor 50 may detect contact by employing any appropriate method including the capacitive method, the resistive film method, the surface acoustic wave method or the ultrasound method, the infrared method, the electromagnetic induction method, and the load detection method. The touch sensor 50 may be made of, for example, a transparent material to avoid interfering with the display on the display 40.

Hereinafter, operation of the tactile sensation providing apparatus 1 will be described with reference to FIG. 6. When the touch panel 10 includes the display 40, the piezoelectric element 20 is arranged, for example, in the vicinity of the periphery of the touch panel 10 to avoid interfering with the display on the display 40 of the touch panel 10. The position of the piezoelectric element 20 is not limited thereto.

Controller

As illustrated in FIG. 6, the tactile sensation providing apparatus 1 further includes the controller 60. The tactile sensation providing apparatus 1 is controlled by the controller 60. The display 40, the touch sensor 50, and the tactile sensation providing unit 20 of the tactile sensation providing apparatus 1 are each connected to the controller 60. Although in FIG. 6 the controller 60 is provided independently of the tactile sensation providing apparatus 1, the controller 60 may be incorporated in the tactile sensation providing apparatus 1.

The controller 60 may be configured with a processor or a microcomputer that is capable of executing application software. As necessary, the controller 60 may appropriately include a memory or the like configured with a storage capable of storing various information. According to the present embodiment, the controller 60 controls and administrates, in particular, various functional units and elements necessary for the tactile sensation providing apparatus 1 to provide the tactile sensation.

The controller 60 outputs image data and the like to the display 40. On the basis of the image data and the like received from the controller 60, the display 40 displays an image and the like.

From the touch sensor 50, the controller 60 acquires the coordinate of the position of the contact by the finger or the stylus pen on the touch surface of the touch sensor 50.

The controller 60 outputs a drive signal to the tactile sensation providing unit 20. The tactile sensation providing unit 20 is also referred to as the piezoelectric element 20.

The drive signal is a voltage signal applied to the piezoelectric element 20. The tactile sensation providing unit 20 generates a vibration in accordance with the drive signal received from the controller 60.

Relation Between Display Area and Tactile Sensation Providing Area

Figure 7:
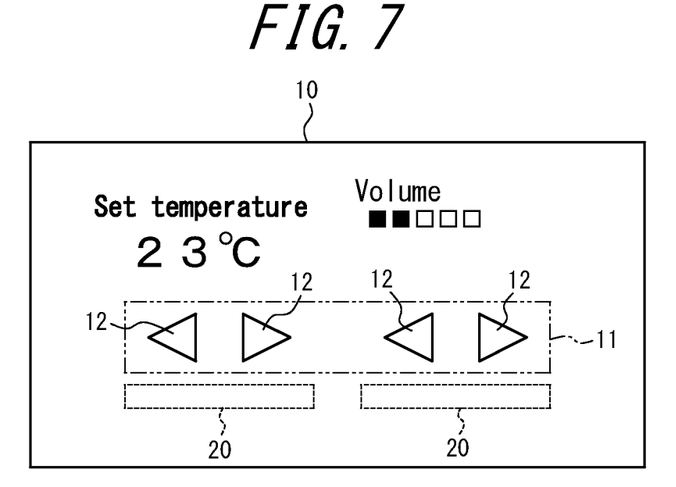
FIG. 7 is an example of a screen on a display of a touch panel.

As illustrated in FIG. 7 by way of example, the tactile sensation providing apparatus 1 may be provided to an instrument panel of an automobile. The information displayed in an upper left area of the display 40 is the set temperature of for an in-car air conditioner. The information displayed in an upper area region of the display 40 is the volume of a car audio. The lower left area and the lower right area of the display 40 each include operation icons 12 having triangle shapes facing left or right and for setting set temperature of the air conditioner or the volume of the car audio.

As illustrated in FIG. 7, the operation icons 12 are displayed in the tactile sensation providing area 11. Thus, a tactile sensation is provided when the user touches the area displaying the operation icons 12 to perform an operation. On the other hand, in the example illustrated in FIG. 7, the information indicating the setting temperature and the volume is displayed outside the tactile sensation providing area 11. This is because the user does not directly touch these areas displaying the information indicating the setting temperature and the volume and, also, the tactile sensation does not need to be provided in response to the touch in respect of these areas.

In the example illustrated in FIG. 7, touch detection is required only in the area displaying operation objects such as the operation icons 12. Thus, the touch sensor 50 of the touch panel 10 needs to be provided only in the area displaying the operation objects. In other words, the touch sensor 50 does not need to be provided across the full face of the touch panel 10.

On the other hand, the area that includes the touch sensor 50 has a fixed structure with hardware and thus is not readily altered. In view of this, a display area of the operation objects such as the operation icons 12 is determined such that it corresponds to the area having the touch sensor 50 of the touch panel 10.

In view of the relation between the display area of the operation objects, the area having the touch sensor 50, and the tactile sensation providing area 11, the tactile sensation providing area 11 is configured to include the area having the touch sensor 50. According to the present embodiment, the area having the touch sensor 50 and the tactile sensation providing area 11 substantially coincide.

As described above, the tactile sensation providing area 11 may constitute a portion of the touch panel 10. To transmit the vibration generated by the piezoelectric element 20 to the tactile sensation providing area 11 of the touch panel 10 without, as far as possible, attenuating the vibration, the piezoelectric element 20 may be arranged in the vicinity of the tactile sensation providing area 11. In other words, the piezoelectric element 20 may be arranged in the vicinity of the touch sensor 50.

The tactile sensation providing apparatus 1 according to the present embodiment may improve the reliability of the joint between the tactile sensation providing apparatus 1 and the housing 5 and, simultaneously, adequately provide a tactile sensation to the user in response to a touch by the user in respect of the touch panel 10.

Second Embodiment

In the tactile sensation providing apparatus 1 according to a second embodiment, the first joint member 31 and the second joint member 30 are made of the same material and have different cross-sectional shapes. In this way, the same effect as the first embodiment may be acquired.

Figure 8:
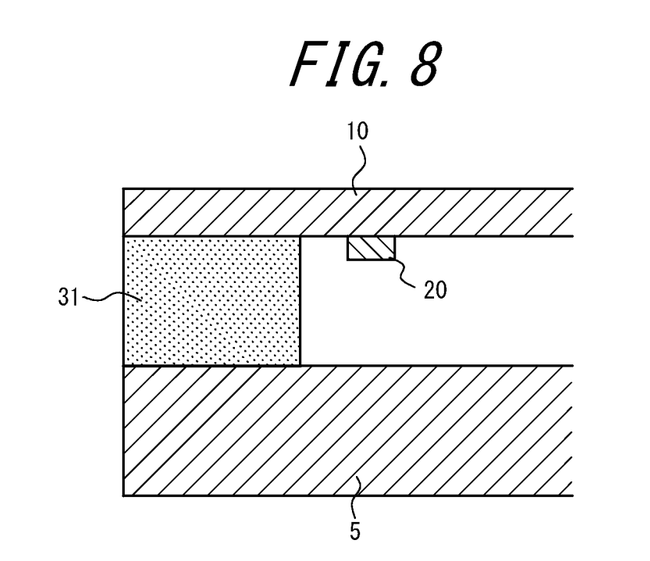
FIG. 8 is a cross-sectional view of a first joint member according to a second embodiment as a comparative example.

The following is a description of the shape of the first joint member 31 according to the second embodiment in comparison to the shape of the first joint member 31 according to a comparative example. As illustrated in FIG. 8, the first joint member 31 according to the comparative example has the same cross-sectional shape as the second joint member 30 illustrated in FIG. 5. According to the second embodiment, further, the first joint member 31 and the second joint member 30 are made of the same material, thus the first joint member 31 and the second joint member 30 have the same spring constant and/or sheer spring constant. At the periphery of the touch panel 10 having the first joint member 31 illustrated in FIG. 8 attached thereto, the vibration may be attenuated similarly to the vibration at the periphery of the touch panel 10 having the second joint member 30 attached thereto.

Figure 9A:
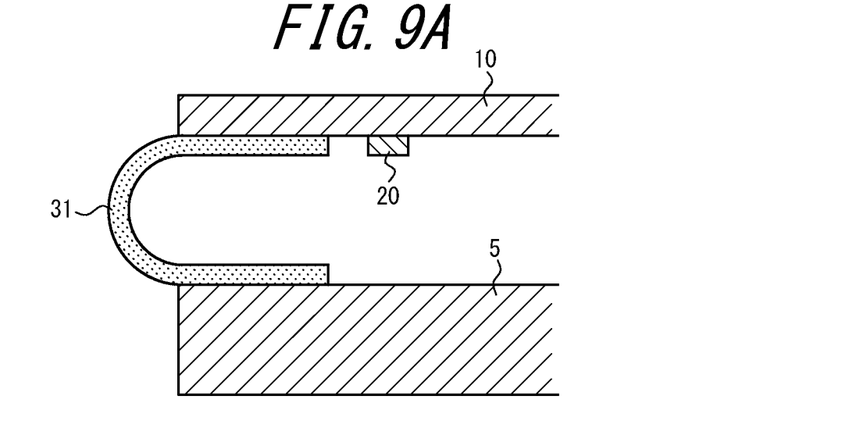
FIG. 9A is a diagram illustrating an example of a cross-sectional shape of the first joint member according to the second embodiment.

The cross-sectional shape of the first joint member 31 illustrated in FIG. 9A has a U-shape. The first joint member 31 illustrated in FIG. 9A is a thin plate curved along the periphery of the touch panel 10. An upper flat portion and a lower flat portion on either side of the curved portion are joined to the touch panel 10 and the housing 5, respectively.

In the example illustrated in FIG. 9A, the curved portion of the first joint member 31 has flexibility. In this case, the spring constant with respect to the axis in the direction normal to the surface of the touch panel 10 may be smaller than that of the example in FIG. 8. When the vibration direction of the touch panel 10 is along the direction normal to the surface of the touch panel 10, the first joint member 31 having the cross-sectional shape illustrated in FIG. 9A may reduce the attenuation of the vibration at the periphery of the touch panel 10 more than the first joint member 31 having the cross-sectional shape illustrated in FIG. 8.

When a force is applied to the touch panel 10 in the left-right direction of FIG. 9A, the sheer spring constant with respect to the axis in the direction normal to the surface of the touch panel 10 may be smaller than that of the example in FIG. 8. When the vibration direction of the touch panel 10 is in the left-right direction of FIG. 9A, the first joint member 31 having the cross-sectional shape illustrated in FIG. 9A may reduce the attenuation of the vibration at the periphery of the touch panel 10 more than the first joint member 31 having the cross-sectional shape illustrated in FIG. 8. The left-right direction of FIG. 9A corresponds to the in-plane direction of the surface of the touch panel 10 and is perpendicular to the periphery having the first joint member 31 attached thereto.

Figure 9B:
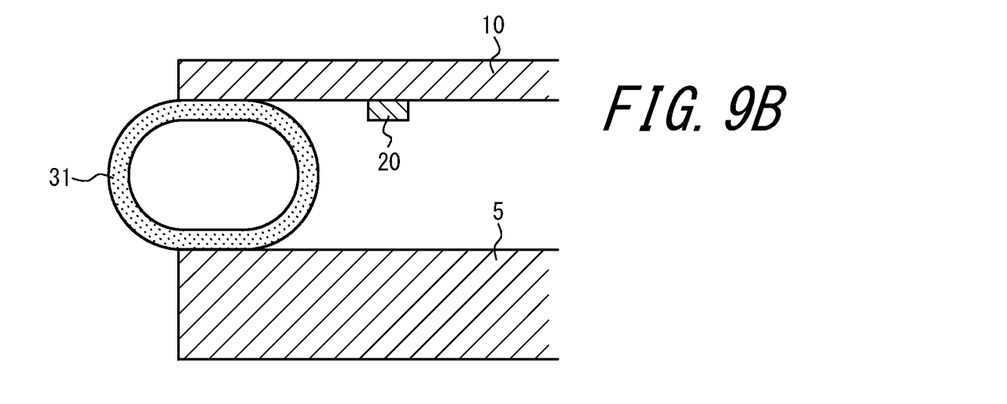
FIG. 9B is a diagram illustrating another example of the cross-sectional shape of the first joint member according to the second embodiment.

As illustrated in FIG. 9B, the cross-sectional shape of the first joint member 31 has an O-shape. The cross-sectional shape of the first joint member 31 illustrated in FIG. 9B is different from that illustrated in FIG. 9A in terms of having curved portions on the left and right sides. The first joint member 31 illustrated in FIG. 9B, similarly to that illustrated in FIG. 9A, includes an upper flat portion and a lower flat portion attached to the touch panel 10 and the housing 5, respectively.

Similarly to the curved portion of the first joint member 31 illustrated in FIG. 9A, the curved portions of the first joint member 31 illustrated in FIG. 9B may have flexibility. Thus, the spring constant with respect to the axis in the direction normal to the surface of the touch panel 10 may be smaller than that of the comparative example in FIG. 8. When the vibration direction of the touch panel 10 is along the direction normal to the surface of the touch panel 10, the first joint member 31 having the cross-sectional shape illustrated in FIG. 9B may reduce the attenuation of the vibration at the periphery of the touch panel 10 more than the first joint member 31 having the cross-sectional shape illustrated in FIG. 8.

When a force is applied to the touch panel 10 in the left-right direction of FIG. 9B, the sheer spring constant with respect to the axis in the direction normal to the surface of the touch panel 10 may be smaller than that of the example in FIG. 8. When the vibration direction of the touch panel 10 is in the left-right direction of FIG. 9B, the first joint member 31 having the cross-sectional shape illustrated in FIG. 9B may reduce the attenuation of the vibration at the periphery of the touch panel 10 more than the first joint member 31 having the cross-sectional shape illustrated in FIG. 8. The left-right direction of FIG. 9B corresponds to the in-surface direction of the surface of the touch panel 10 and is perpendicular to the periphery having the first joint member 31 attached thereto.

Figure 9C:
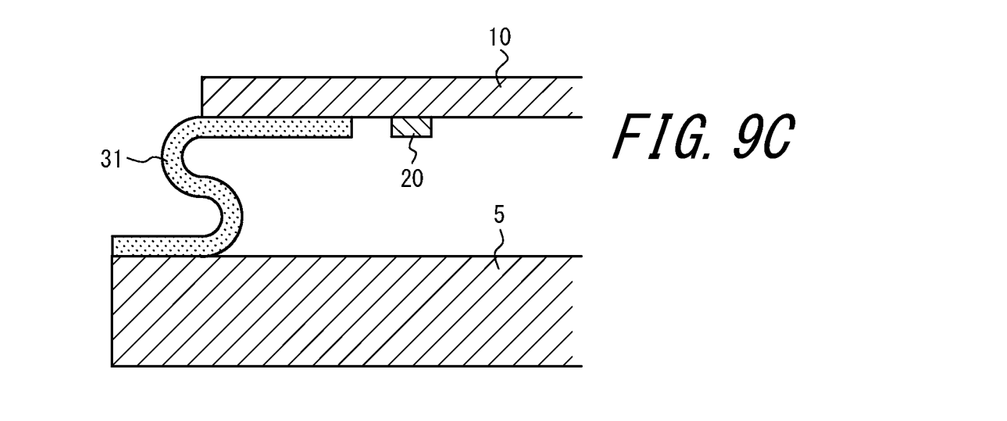
FIG. 9C is a diagram illustrating still another example of the cross-sectional shape of the first joint member according to the second embodiment.

The cross-sectional shape of the first joint member 31 illustrated in FIG. 9C has an S-shape. The cross-sectional shape of the first joint member 31 illustrated in FIG. 9C is different from that illustrated in FIG. 9A in that it has vertically arranged curved portions. The first joint member 31 illustrated in FIG. 9C, similarly to that illustrated in FIG. 9A, includes an upper flat portion and a lower flat portion attached to the touch panel 10 and the housing 5, respectively.

Similarly to the curved portion of the first joint member 31 illustrated in FIG. 9A, the curved portion of the first joint member 31 illustrated in FIG. 9C may have flexibility. Thus, the spring constant with respect to the axis in the direction normal to the surface of the touch panel 10 may be smaller than that of the example in FIG. 8. When the vibration direction of the touch panel 10 is along the direction normal to the surface of the touch panel 10, the first joint member 31 having the cross-sectional shape illustrated in FIG. 9C may reduce the attenuation of the vibration at the periphery of the touch panel 10 more than the first joint member 31 having the cross-sectional shape illustrated in FIG. 8.

When a force is applied to the touch panel 10 in the left-right direction of FIG. 9C, the sheer spring constant with respect to the axis in the direction normal to the surface of the touch panel 10 may be smaller than that of the example in FIG. 8. When the vibration direction of the touch panel 10 is in the left-right direction of FIG. 9C, the first joint member 31 having the cross-sectional shape illustrated in FIG. 9C may reduce the attenuation of the vibration at the periphery of the touch panel 10 more than the first joint member 31 having the cross-sectional shape illustrated in FIG. 8. The left-right direction of FIG. 9C corresponds to the in-surface direction of the surface of the touch panel 10 and is perpendicular to the periphery having the first joint member 31 attached thereto.

The cross-sectional shapes of the first joint member 31 illustrated in FIGS. 9A, 9B, and 9C are provided for illustrative purpose only. The cross-sectional shape of the first joint member 31 may be, for example, a V-shape, a W-shape, or a Z-shape (an N-shape) having a bent portion (bent portions), or various other shapes. The cross-sectional shape of the first joint member 31 is not limited thereto but may be any appropriate shape that has relatively high elasticity whilst preserving the dustproof properties and the waterproof properties at the joint between the tactile sensation providing apparatus 1 and the housing 5.

In the tactile sensation providing apparatus 1 according to the second embodiment, when the material of the first joint member 31 is the same as the material of the second joint member 30, the cross-sectional shape of the first joint member 31 may take various shapes. Thus, the joint structure of the first joint member 31 may be different from the joint structure of the second joint member 30. As a result, the attenuation of the vibration at the periphery of the touch panel 10 having the first joint member 31 attached thereto may be reduced. Further, the waterproof properties and the dustproof properties of the tactile sensation providing apparatus 1 may be ensured.

Third Embodiment

The tactile sensation providing apparatus 1 according to a third embodiment includes a sheet member 32 between the first joint member 31 and the touch panel 10.

Figure 10:
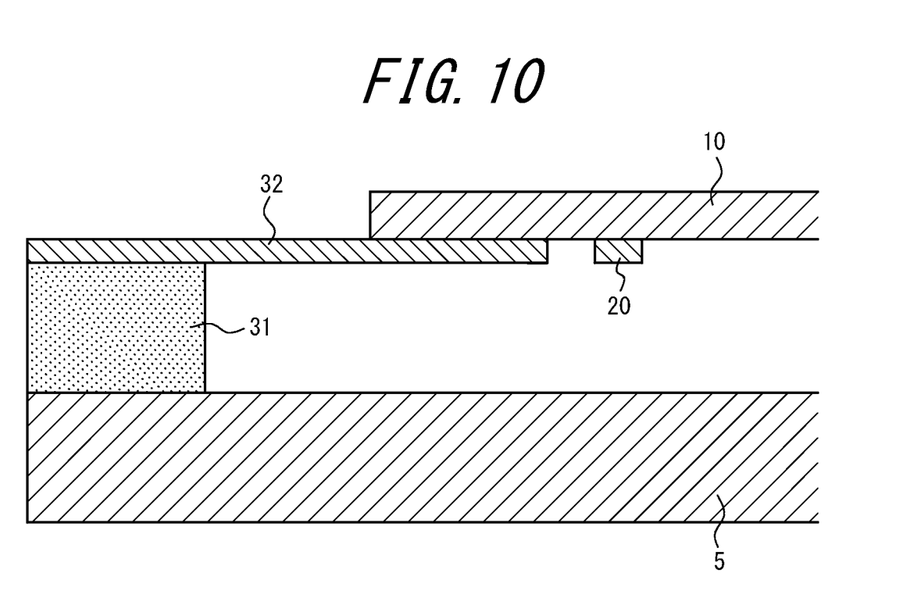
FIG. 10 is a diagram illustrating an example of the cross-sectional shape of the first joint member according to a third embodiment.

As illustrated in FIG. 10, the cross-sectional shape of the first joint member 31 according to the present embodiment is the same as the cross-sectional shape of the comparative example illustrated in FIG. 8. The first joint member 31 according to the present embodiment is different from the first joint member 31 of the comparative example illustrated in FIG. 8 in terms of being attached to the touch panel 10 via the sheet member 32. According to the present embodiment, the first joint member 31 is directly attached to the housing 5 similarly to the first joint member 31 of the comparative example illustrated in FIG. 8.

In the example illustrated in FIG. 10, the sheet member 32 is made of, but not limited to, a rubber material. The sheet member 32 may be made of the same material as the second joint member 30. The sheet member 32 may be made of a film material having the waterproof properties and the dustproof properties. The sheet member 32 may be made of other materials.

In the example illustrated in FIG. 10, the sheet member 32 may have rigidity lower than the first joint member 31 according to the present embodiment. The sheet member 32 may be attached in such a manner as to avoid interfering with the movement of the touch panel 10. The sheet member 32 does not need to be taut as illustrated in FIG. 10. The sheet member 32 may be attached in a slack state between the touch panel 10 and the first joint member 31.

When the sheet member 32 is attached in the slack state, the periphery of the touch panel 10 having the sheet member 32 attached thereto is not restricted with respect to the housing 5. In this case, the periphery of the touch panel 10 having the sheet member 32 attached thereto does not contribute to the enhancement of the rigidity of the tactile sensation providing apparatus 1. The overall rigidity of the tactile sensation providing apparatus 1 may be enhanced by the joint structure of the other peripheries of the touch panel 10. On the other hand, the periphery of the touch panel 10 having the sheet member 32 attached thereto may freely move without restriction with respect to the housing 5, and thus at this periphery the vibration generated by the piezoelectric element 20 is less attenuated.

In the tactile sensation providing apparatus 1 according to the third embodiment, depending on the joining manner, the attenuation of the vibration at the periphery of the touch panel 10 having the first joint member 31 attached thereto is reduced. Further, the waterproof properties and the dustproof properties of the tactile sensation providing apparatus 1 may be readily ensured.

Fourth Embodiment

The tactile sensation providing apparatus 1 according to a fourth embodiment may further include the sheet member 32 at the periphery of the touch panel 10 having the first joint member 31 attached thereto.

For example, in the configurations illustrated in FIGS. 9A, 9B, and 9C, the sheet member 32 may be provided in such a manner as to cover the joint between the first joint member 31 and the touch panel 10, the joint between the first joint member 31 and the housing 5, and the first joint member 31. Similarly to the third embodiment, adding the sheet member 32 may prevent restriction at the periphery of the touch panel 10. In this way, the vibration at the touch panel 10 having the first joint member 31 attached thereto is less attenuated. Further, the waterproof properties and the dustproof properties of the joint between the tactile sensation providing apparatus 1 and the housing 5 may be further enhanced.

Although the disclosure has been described on the basis of the figures and the embodiments, it is to be understood that various modifications and changes may be implemented on the basis of the disclosure by those who are ordinarily skilled in the art. Accordingly, such modifications and changes are included in the scope of the present disclosure.

REFERENCE SIGNS LIST 1 tactile sensation providing apparatus
5 housing
10 touch panel
11 tactile sensation providing area
12 operation icon
20 tactile sensation providing unit (piezoelectric element)
30 second joint member
31 first joint member
32 sheet member
40 display
50 touch sensor
60 controller

The invention claimed is:

1. A tactile sensation providing apparatus comprising:
a panel;
a tactile sensation providing unit arranged on the panel and configured to vibrate the panel; and
a joint structure with respect to a housing, wherein
the joint structure includes a first joint member and a second joint member,
the first joint member is positioned closer to a center of the tactile sensation providing unit than the second joint member,
the first joint member has a curved cross-sectional shape, and
joint strength between the tactile sensation providing apparatus and the housing by the first joint member is lower than the joint strength by the second joint member.

2. The tactile sensation providing apparatus according to claim 1,
wherein a spring constant of the first joint member is smaller than a spring constant of the second joint member.

3. The tactile sensation providing apparatus according to claim 2,
wherein the Young's modulus of a material of the first joint member is smaller than the Young's modulus of a material of the second joint member.

4. The tactile sensation providing apparatus according to claim 3,
wherein the first joint member includes a curved portion or a bent portion.

5. The tactile sensation providing apparatus according to claim 4,
wherein the joint structure of the first joint member does not impose a restriction between the tactile sensation providing apparatus and the housing.

6. The tactile sensation providing apparatus according to claim 3,
wherein the joint structure of the first joint member does not impose a restriction between the tactile sensation providing apparatus and the housing.

7. The tactile sensation providing apparatus according to claim 2,
wherein the first joint member includes a curved portion or a bent portion.

8. The tactile sensation providing apparatus according to claim 7,
wherein the joint structure of the first joint member does not impose a restriction between the tactile sensation providing apparatus and the housing.

9. The tactile sensation providing apparatus according to claim 2,
wherein the joint structure of the first joint member does not impose a restriction between the tactile sensation providing apparatus and the housing.

10. The tactile sensation providing apparatus according to claim 1,
wherein the joint structure of the first joint member does not impose a restriction between the tactile sensation providing apparatus and the housing.

11. The tactile sensation providing apparatus according to claim 1,
wherein the curved cross-sectional shape of the first joint member overlaps itself, when viewed in a plan view.

12. A tactile sensation providing apparatus comprising:
a panel;
a tactile sensation providing unit arranged on the panel and configured to vibrate the panel; and
a joint structure with respect to a housing, wherein
the joint structure includes a first joint member and a second joint member,
the first joint member is positioned closer to a center of the tactile sensation providing unit than the second joint member,
the first joint member has a curved cross-sectional shape, and
a spring constant of the first joint member is smaller than a spring constant of the second joint member.

13. The tactile sensation providing apparatus according to claim 12,
wherein the Young's modulus of a material of the first joint member is smaller than the Young's modulus of a material of the second joint member.

14. The tactile sensation providing apparatus according to claim 13,
wherein the first joint member includes a curved portion or a bent portion.

15. The tactile sensation providing apparatus according to claim 14,
wherein the joint structure of the first joint member does not impose a restriction between the tactile sensation providing apparatus and the housing.

16. The tactile sensation providing apparatus according to claim 13,
wherein the joint structure of the first joint member does not impose a restriction between the tactile sensation providing apparatus and the housing.

17. The tactile sensation providing apparatus according to claim 12,
wherein the first joint member includes a curved portion or a bent portion.

18. The tactile sensation providing apparatus according to claim 17,
wherein the joint structure of the first joint member does not impose a restriction between the tactile sensation providing apparatus and the housing.

19. The tactile sensation providing apparatus according to claim 12,
wherein the joint structure of the first joint member does not impose a restriction between the tactile sensation providing apparatus and the housing.

20. The tactile sensation providing apparatus according to claim 12,
wherein the curved cross-sectional shape of the first joint member overlaps itself, when viewed in a plan view.

* * * * *